J. H. ABBOTT.
DENTAL TOOL GUARD.
APPLICATION FILED JUNE 16, 1911.
1,067,571.
Patented July 15, 1913.
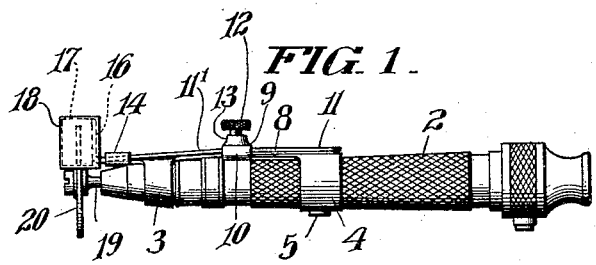
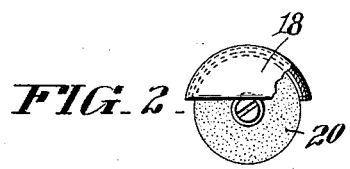
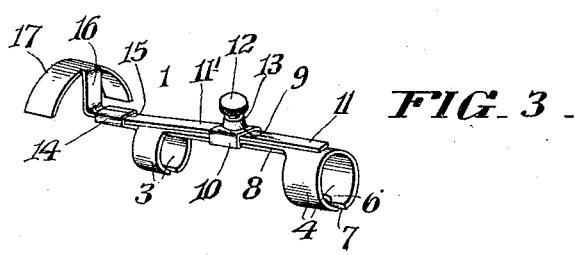
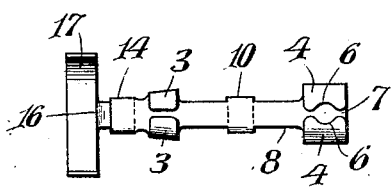
Witnesses
A. Helen Alspanalp.
Thos. D. Mowlds
Inventor
James Herman Abbott,
By William Steell Jackson
Attorney
COLUMBIA PLANOGRAPH CO., WASHINGTON, D. C.

UNITED STATES PATENT OFFICE.

JAMES HERMAN ABBOTT, OF PHILADELPHIA, PENNSYLVANIA.

DENTAL TOOL-GUARD.

1,067,571.  Specification of Letters Patent.  Patented July 15, 1913.

Application filed June 16, 1911. Serial No. 633,520.

*To all whom it may concern:*

Be it known that I, JAMES HERMAN ABBOTT, a citizen of the United States, and a resident of Philadelphia, Pennsylvania, have invented a certain new and useful Dental Tool-Guard, of which the following is a specification.

The purpose of my invention is to provide a removable cover for all parts of the guard coming in contact with the patient's mouth, making the cover of soft material which can be readily sterilized and which can be retained by simple and effective means.

Figure 1 is a side elevation of a structure embodying my invention. Fig. 2 is an end elevation, partly broken and in section, of the structure shown in Fig. 1. Fig. 3 is a perspective of the guard and support of Fig. 1 without the cover. Fig. 4 is a bottom plan view of the structure of Fig. 3. Fig. 5 is a perspective view of the removable cover for the guard.

Similar numerals of reference indicate like parts in the drawings.

1 designates an attachment adapted to be mounted upon the hand piece 2 of the dental drill by means of spring clips 3, 3 and 4, 4, preferably formed from lateral extensions of the body of the attachment and which are made of proper size to fit the dental hand pieces upon the market. Each of these dental hand pieces is provided with a pin or stud 5. I cause my guard to surround and, preferably, to engage this pin or stud with a yielding pressure from the circumferential spring action of the parts 4, 4. By recessing the faces of the parts 4, 4 at 6, I provide a seat for the pin or stub between the parts 4, 4 where they are spaced at 7, so that the attachment may be pressed to place by longitudinal movement only and may be held yieldingly against rotation as well as against longitudinal movement.

At any suitable point in the connection 8 between the parts 3, 3 and 4, 4 of the attachment 1, I form a socket 9, preferably by lateral and reversely turned extensions 10, 10 from the connection 8, and secure a rod or strip 11, making it longitudinally adjustable in this socket and securing it therein by means which may include any suitable fastening 12, reinforcing the socket for the use of the fastener at 13, if desirable.

Near the outer end of the attachment, and in approximate line with the connection 8, I provide lateral extensions 14, reversely turned to make an additional socket 15 for the rod or strip 11, and pass the guard rod or strip 11 through the openings 15 and 9, retaining it preferably by friction due to spring pressure of the rod or strip, which, for this purpose, is slightly bent as at 11'. The frictional retention thus secured, in whatever position of adjustment, may be replaced or reinforced by the fastening 12.

I extend the rod or strip 11 angularly at 16 to connect with the guard 17 of arc form, most desirably less than a semicircle. This guard member 17 forms the frame or support about which I stretch or secure a cover 18 preferably of elastic material such as rubber. I make this cover removable in order that it may be omitted where free view of the rotary member guarded is desired and for convenience of sterilization. By this means also I secure a non-metallic protection for the support 17 which is soft and warm to the touch and free from all of the objections present in metallic parts.

In operation the attachment 1 is moved longitudinally to place, the parts 4 surrounding the pin 5 and preferably circumferentially springing against it. The guard rod 11 and the spindle 19 of the disk, brush or other rotating member 20 may be inserted together with the cover 18 in place, or the rod and spindle may be inserted independently and in any preferred order, after which the cover 18 is put in place.

In practice I prefer to supply but a single attachment 1, with additional guard supports 17 to fit different sized disks or brushes or surround them to different extents. These supports are provided with correspondingly different sized parts or extensions 16. Except where it is desired to cover different extents of surface of the brush, the same cover 18 may be used for various sizes of mount 17.

Having thus described my invention, what I claim as new and desire to secure by Letters Patent is:—

In a device of the character stated, a guard support, means for mounting it upon a dental hand piece in proximity to a rotating pulley, and a flexible cover, adapted to be detachable, secured to the guard support to partly surround the rotating pulley.

JAMES HERMAN ABBOTT.

Witnesses:
WILLIAM STEELL JACKSON,
HELEN J. KAUFFMAN.